United States Patent
Yang et al.

(10) Patent No.: US 11,910,320 B2
(45) Date of Patent: Feb. 20, 2024

(54) HANDLING NEW RADIO (NR) TRAFFIC CONFIGURED WITH NON-INTEGER PERIODICITY

(71) Applicant: Apple Inc., Cupertino, CA (US)

(72) Inventors: Weidong Yang, San Diego, CA (US); Huaning Niu, San Jose, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 17/446,817

(22) Filed: Sep. 2, 2021

(65) Prior Publication Data
US 2022/0394618 A1 Dec. 8, 2022

Related U.S. Application Data

(63) Continuation-in-part of application No. PCT/CN2021/098692, filed on Jun. 7, 2021.

(51) Int. Cl.
*H04W 72/12* (2023.01)
*H04W 52/02* (2009.01)
(Continued)

(52) U.S. Cl.
CPC ...... *H04W 52/0232* (2013.01); *H04B 7/0626* (2013.01); *H04W 52/0216* (2013.01); *H04W 72/1263* (2013.01); *H04W 72/54* (2023.01)

(58) Field of Classification Search
CPC ............ H04W 52/0232; H04W 72/54; H04W 52/0216; H04W 72/1263
See application file for complete search history.

(56) References Cited

U.S. PATENT DOCUMENTS

| 2012/0113816 A1* | 5/2012 | Bhattad | ............... H04L 25/0226 370/246 |
| 2018/0279149 A1* | 9/2018 | Li | ......................... H04L 5/0091 |

(Continued)

FOREIGN PATENT DOCUMENTS

WO  2020/222598  11/2020

OTHER PUBLICATIONS

Source: Vivo; Title: "Challenges and potential enhancements of XR"; Date: May 10-27, 2021; R1-2104398 vol. RAN WG1, No. e-Meeting; May 10, 2021-May 27, 2021; pp. 1-7 (Year: 2021).*

(Continued)

*Primary Examiner* — Fahmida S Chowdhury
(74) *Attorney, Agent, or Firm* — Fay Kaplun & Marcin, LLP

(57) ABSTRACT

A user equipment (UE) is configured to report channel state information (CSI). The UE receives CSI configuration information corresponding to downlink new radio (NR) traffic with non-integer periodicity, wherein the CSI configuration information includes one of CSI measurement configuration information, CSI reporting configuration information or CSI measurement configuration information and CSI reporting configuration information, receives CSI measurement resources and reports CSI feedback to a network.

20 Claims, 15 Drawing Sheets

(51) Int. Cl.
*H04B 7/06* (2006.01)
*H04W 72/1263* (2023.01)
*H04W 72/54* (2023.01)

(56) References Cited

U.S. PATENT DOCUMENTS

| | | | |
|---|---|---|---|
| 2019/0037495 A1* | 1/2019 | John Wilson | H04W 56/001 |
| 2019/0215897 A1* | 7/2019 | Babaei | H04W 76/38 |
| 2019/0246395 A1* | 8/2019 | Huang | H04W 72/12 |
| 2020/0092908 A1* | 3/2020 | Li | H04W 72/0446 |
| 2020/0252875 A1* | 8/2020 | Qiu | H04W 52/0248 |
| 2020/0367171 A1* | 11/2020 | Tsai | H04W 52/0216 |
| 2021/0076387 A1* | 3/2021 | Papasakellariou | H04L 5/14 |
| 2021/0176013 A1* | 6/2021 | Ali | H04L 1/1864 |
| 2022/0304010 A1* | 9/2022 | Han | H04W 72/0446 |
| 2022/0361281 A1* | 11/2022 | Paris | H04W 52/0229 |

OTHER PUBLICATIONS

Title: "Technical Specification Group Radio Access Network; NR; Radio Resource Control (RRC) protocol specification"; R1-2104398; Date: Mar. 30, 2021; vol. RAN WG2, No. V16.4.1; pp. 400-440; (Year: 2021).*

Vivo, "Challenges and potential enhancements of XR", 3GPP TSG RAN WG1 #104-e, R1-2100479, Feb. 5, 2021, 6 sheets.

Vivo, "Challenges and potential enhancements of XR", 3GPP TSG RAN WG1 #105-e, R1-2104398, May 27, 2021, 7 sheets.

"3GPP; Technical Specification Group Radio Access Network; NR; Radio Resource Control (RRC) protocol specification (Release 16)", 3GPP TS 38.331, RAN WG2 v16.4.1, Mar. 30, 2021, 949 sheets.

Apple Inc., "Views on XR specific capacity enhancements techniques", 3GPP TSG RAN WG1, R1- 2204265, Apr. 29, 2022, 6 sheets.

* cited by examiner

```
CSI-ReportPeriodicityAndOffset ::= CHOICE {
    slots4 INTEGER(0..3),
    slots5 INTEGER(0..4),
    slots8 INTEGER(0..7),
    slots10 INTEGER(0..9),
    slots16 INTEGER(0..15),
    slots20 INTEGER(0..19),
    slots40 INTEGER(0..39),
    slots80 INTEGER(0..79),
    slots160 INTEGER(0..159),
    slots320 INTEGER(0..319),
    M1 INTEGER (0...2^16-1)
    M2 INTEGER (0...2^16-1)
    Offset INTEGER (0...2^16-1)
}
```

Fig. 7

```
CSI-ResourcePeriodicityAndOffset ::= CHOICE {
    slots4 INTEGER (0..3),
    slots5 INTEGER (0..4),
    slots8 INTEGER (0..7),
    slots10 INTEGER (0..9),
    slots16 INTEGER (0..15),
    slots20 INTEGER (0..19),
    slots32 INTEGER (0..31),
    slots40 INTEGER (0..39),
    slots64 INTEGER (0..63),
    slots80 INTEGER (0..79),
    slots160 INTEGER (0..159),
    slots320 INTEGER (0..319),
    slots640 INTEGER (0..639)
    M1 INTEGER (0...2^16-1)
    M2 INTEGER (0...2^16-1)
    Offset INTEGER (0...2^16-1)
}
```

Fig. 8

```
CSI-ResourcePeriodicityAndOffset ::= CHOICE {
    slots4 INTEGER (0..3),
    slots5 INTEGER (0..4),
    slots8 INTEGER (0..7),
    slots10 INTEGER (0..9),
    slots16 INTEGER (0..15),
    slots20 INTEGER (0..19),
    slots32 INTEGER (0..31),
    slots40 INTEGER (0..39),
    slots64 INTEGER (0..63),
    slots80 INTEGER (0..79),
    slots160 INTEGER (0..159),
    slots320 INTEGER (0..319),
    slots640 INTEGER (0..639),
    M1 INTEGER (0...2^16-1),
    M2 INTEGER (0...2^16-1),
    Offset INTEGER (0...2^16-1)
}
```

Fig. 9

```
SRS-PeriodicityAndOffset-r16 ::= CHOICE {
    sl1 NULL,
    sl2 INTEGER(0..1),
    sl4 INTEGER(0..3),
    sl5 INTEGER(0..4),
    sl8 INTEGER(0..7),
    sl10 INTEGER(0..9),
    sl16 INTEGER(0..15),
    sl20 INTEGER(0..19),
    sl32 INTEGER(0..31),
    sl40 INTEGER(0..39),
    sl64 INTEGER(0..63),
    sl80 INTEGER(0..79),
    sl160 INTEGER(0..159),
    sl320 INTEGER(0..319),
    sl640 INTEGER(0..639),
    sl1280 INTEGER(0..1279),
    sl2560 INTEGER(0..2559),
    sl5120 INTEGER(0..5119),
    sl10240 INTEGER(0..10239),
    sl40960 INTEGER(0..40959),
    sl81920 INTEGER(0..81919),
    M1 INTEGER (0...2^16-1),
    M2 INTEGER (0...2^16-1),
    Offset INTEGER (0...2^16-1)
    ...
}
```

Fig. 14

```
SRS-PeriodicityAndOffset-r16 ::= CHOICE {
    sl1 NULL,
    sl2 INTEGER(0..1),
    sl4 INTEGER(0..3),
    sl5 INTEGER(0..4),
    sl8 INTEGER(0..7),
    sl10 INTEGER(0..9),
    sl16 INTEGER(0..15),
    sl20 INTEGER(0..19),
    sl32 INTEGER(0..31),
    sl40 INTEGER(0..39),
    sl64 INTEGER(0..63),
    sl80 INTEGER(0..79),
    sl160 INTEGER(0..159),
    sl320 INTEGER(0..319),
    sl640 INTEGER(0..639),
    sl1280 INTEGER(0..1279),
    sl2560 INTEGER(0..2559),
    sl5120 INTEGER(0..5119),
    sl10240 INTEGER(0..10239),
    sl40960 INTEGER(0..40959),
    sl81920 INTEGER(0..81919),
    Frequency {1,2,3,..., 480}
    Offset INTEGER (0...2^16-1)
....
}
```

Fig. 15

HANDLING NEW RADIO (NR) TRAFFIC CONFIGURED WITH NON-INTEGER PERIODICITY

PRIORITY/INCORPORATION BY REFERENCE

This application claims priority to PCT Application PCT/CN2021/098692 entitled "Handling New Radio (NR) Traffic Configured with Non-Integer Periodicity," filed on Jun. 7, 2021, the entirety of which is incorporated herein by reference.

BACKGROUND

In a new radio (NR) network, for any of a variety of different reasons, there may be traffic that is generated at cadences which are not integer multiples of the units of time supported in NR. For example, augmented reality (AR) and virtual reality (VR) applications may have traffic that is not supported by any NR unit of time. In NR, the existing solution to address this type of timing issue is the over-provisioning of resources. However, this is an inefficient use of network resources and may cause a user equipment (UE) to experience a power drain. Accordingly, there is a need for enhancements for managing NR traffic that does not match NR's default timing.

SUMMARY

Some exemplary embodiments are related to a processor of a user equipment (UE) configured to perform operations. The operations include receiving channel state information (CSI) configuration information corresponding to downlink new radio (NR) traffic with non-integer periodicity, wherein the CSI configuration information includes one of CSI measurement configuration information, CSI reporting configuration information or CSI measurement configuration information and CSI reporting configuration information, receiving CSI measurement resources and reporting CSI feedback to a network.

Other exemplary embodiments are related to a processor of a base station configured to perform operations. The operations include transmitting channel state information (CSI) configuration information corresponding to downlink new radio (NR) traffic with non-integer periodicity to a user equipment (UE), wherein the CSI configuration information includes one or more of CSI measurement configuration information and CSI reporting configuration information, transmitting CSI measurement resources and receiving CSI feedback from the UE.

Still further exemplary embodiments are related to a processor of a user equipment (UE) configured to perform operations. The operations include receiving connected discontinuous reception (cDRX) configuration information for downlink new radio (NR) traffic with non-integer periodicity, implementing a cDRX cycle based on the configuration information and receiving physical downlink control channel (PDCCH) during an onDuration of the cDRX cycle.

Additional exemplary embodiments are related to a processor of a base station configured to perform operations. The operations include transmitting connected discontinuous reception (cDRX) configuration information for downlink new radio (NR) traffic with non-integer periodicity to a user equipment (UE) and transmitting physical downlink control channel (PDCCH) during an onDuration of a cDRX cycle implemented by the UE.

BRIEF DESCRIPTION OF THE DRAWINGS

FIG. 7 shows an example CSI-ReportPeriodicityAndOffset radio resource control (RRC) parameter configured to include an indication of the supported non-integer periodicity and offset.

FIG. 8 shows an example CSI-ResourcePeriodicityAndOffset RRC parameter configured to include an indication of the supported non-integer periodicity and offset for periodic and semi-persistent non-zero power (NZP) CSI-RS.

FIG. 9 shows an example CSI-ResourcePeriodicityAndOffset RRC parameter configured to include an indication of the supported non-integer periodicity and offset for periodic and semi-persistent CSI-IM.

FIG. 14 shows an example of an SRS-PeriodicityandOffset RRC parameter configured to include an indication of the supported non-integer periodicity and offset for sounding reference signals (SRS) according to various exemplary embodiments.

FIG. 15 shows an example of SRS-PeriodicityandOffset RRC parameter configured to include an indication of the supported non-integer periodicity and offset for SRS according to various exemplary embodiments.

DETAILED DESCRIPTION

Figure 1:
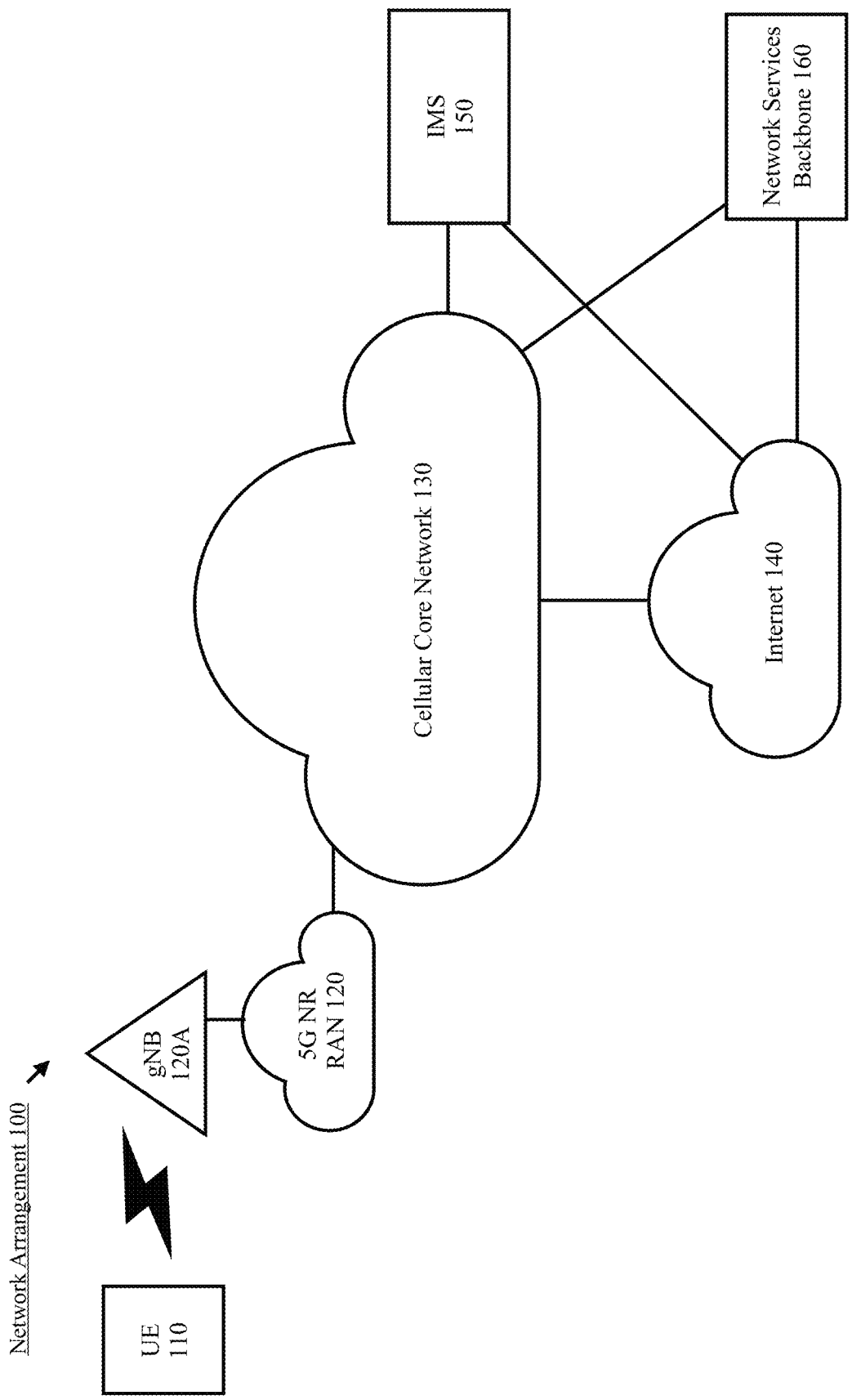
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce techniques for handling traffic that may not match integer multiples of the units of time supported in new radio (NR). In one aspect, the exemplary embodiments relate to channel state information (CSI) feedback. As will be described in more detail below, some of the exemplary techniques described herein may enable a user equipment (UE) to implement power efficient CSI feedback for traffic such as eXtended reality (XR) traffic that may be generated at cadences which are not integer multiples of NR units of time (e.g., non-integer periodicity). In another aspect, the exemplary embodiments relate to connected discontinuous reception (cDRX). As will be described in more detail below, some of the exemplary techniques described herein enable the UE to implement cDRX for NR traffic that may be generated at cadences which are not integer multiples of NR's default timing.

The exemplary embodiments are described with regard to eXtended Reality (XR). Those skilled in the art will understand that XR is an umbrella term for different types of realities and may generally refer to real-and-virtual combined environments and associated human-machine interactions generated by computer technology and wearables. To provide some examples, the term XR may encompass augmented reality (AR), mixed reality (MR) and virtual reality (VR). However, any reference to XR being specific to a particular use case or type of traffic is merely provided for illustrative purposes. The exemplary embodiments apply to any type of NR traffic that may be generated at cadences which are not integer multiples of NR's default timing.

During operation, XR services may utilize multiple data flows in the uplink (UL) and/or downlink (DL). For example, in the DL, there may be a video stream, an audio stream and/or a data stream. In the UL, there may be a control stream and/or a pose stream. From a physical channel perspective, there may be different control channels and shared channels for each stream or multiple streams may share a control channel and/or shared channel. In some configurations, each stream may have different quality of service (QoS) requirements (e.g., block error rate (BLER), latency requirements, etc.).

In addition, the exemplary embodiments are described with regard to a UE. Those skilled in the art will understand that the UE may be any type of electronic component that is configured to communicate via a network, e.g., mobile phones, tablet computers, desktop computers, smartphones, phablets, embedded devices, wearables, Internet of Things (IoT) devices, etc. With regard to XR, in some configurations, the UE may be paired with a wearable device (e.g., a head mounted display (HMD), AR glasses, etc.). In this type of configuration, the UE may communicate directly with the network and then relay data to the wearable device which presents the XR content to the user (e.g., AR, VR, MR, etc.). In other configurations, the UE may be a wearable device that communicates directly with the network and presents the XR content to the user. Therefore, the UE as described herein is used to represent any electronic component that directly communicates with the network.

Although the exemplary embodiments are described with regard to providing enhancements for XR services, the exemplary embodiments are not limited to XR services and may apply to any type of NR traffic configured with non-integer periodicity. To provide another example, in industrial Internet of things (IIoT), traffic may be generated from an installed system with a long use life. In this type of scenario, it is difficult to modify the traffic generation periodicity to match any of NR's units of time. Those skilled in the art will understand how the exemplary techniques described herein may be applied to IIoT and any other type of NR traffic that may not match NR's default timing.

In one aspect, the exemplary embodiments introduce CSI feedback enhancements for XR. As will be described in more detail below, CSI feedback enhancements including measurement and/or reporting matched to traffic arrival are introduced to improve UE power saving and performance with regard to XR (or any other type of traffic that may not match NR's existing timing). Further, exemplary enhancements to enable periodic (P) and semi-persistent (SP) CSI measurement and reporting matched to the application traffic periodicity and offset are introduced In addition, CSI feedback measurement and/or reporting matched to semi-persistent scheduling (SPS) physical downlink shared channel (PDSCH) reception are introduced. The exemplary CSI feedback enhancements described herein may be used in conjunction with currently implemented CSI feedback techniques, future implementations of CSI feedback techniques or independently from other CSI feedback techniques.

In another aspect, the exemplary embodiments introduce cDRX enhancements for XR. As will be described in more detail below, UE power efficient cDRX configurations for XR traffic (or any other type of NR traffic that may not match NR's default timing) are introduced. These enhancements may include non-integer periodicity for cDRX configuration, using a combination of long DRX and short DRX to match traffic periodicity and using a physical downlink control channel (PDCCH) wake up signal (WUS) to indicate dynamic traffic. The exemplary cDRX enhancements described herein may be used in conjunction with currently implemented cDRX mechanisms, future implementations of cDRX mechanisms or independently from other cDRX mechanisms.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables (e.g., HMD, AR glasses, etc.), Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The UE 110 may connect to the 5G NR-RAN 120 via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., gNB 120A). However, as mentioned above, reference to the 5G NR-RAN 120 is merely for illustrative purposes and any appropriate type of RAN may be used.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
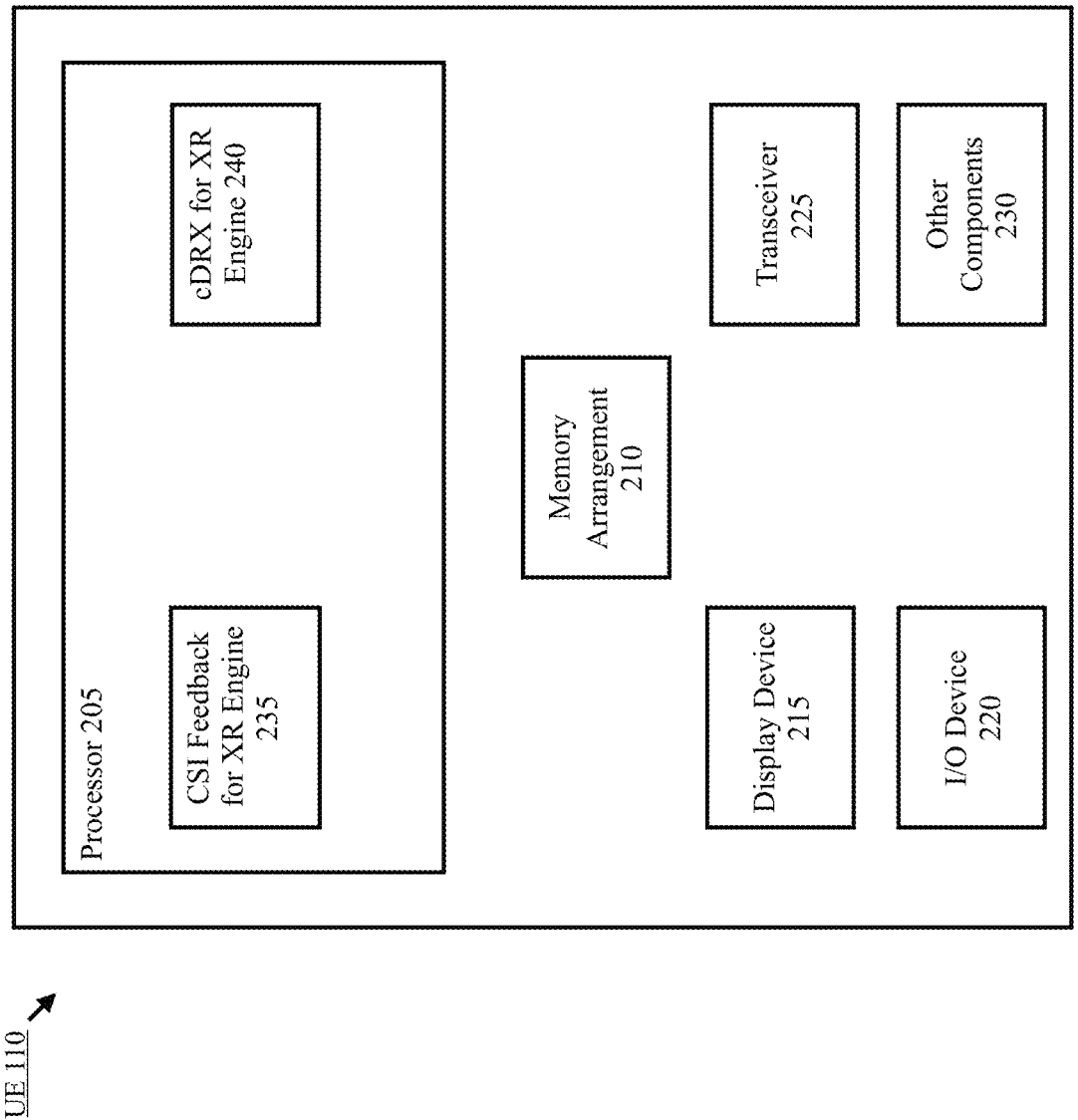
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a CSI feedback for XR engine 235 and a cDRX for XR engine 240. The CSI feedback for XR engine 235 may perform various operations related to the exemplary CSI feedback enhancements described herein. These operations may include, but are not limited to, receiving CSI configuration information, identifying CSI resources, performing CSI measurements and reporting CSI feedback. The cDRX for XR engine 240 may perform various operations related to the exemplary cDRX enhancements described herein. These operations may include, but are not limited to, receiving cDRX configuration information, implementing a cDRX cycle and receiving PDCCH.

The above referenced engines 235, 240 each being an application (e.g., a program) executed by the processor 205 is merely provided for illustrative purposes. The functionality associated with the engines 235, 240 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and/or any other appropriate type of network. Accordingly, the transceiver 225 may operate on a variety of different frequencies or channels (e.g., set of consecutive frequencies).

Figure 3:
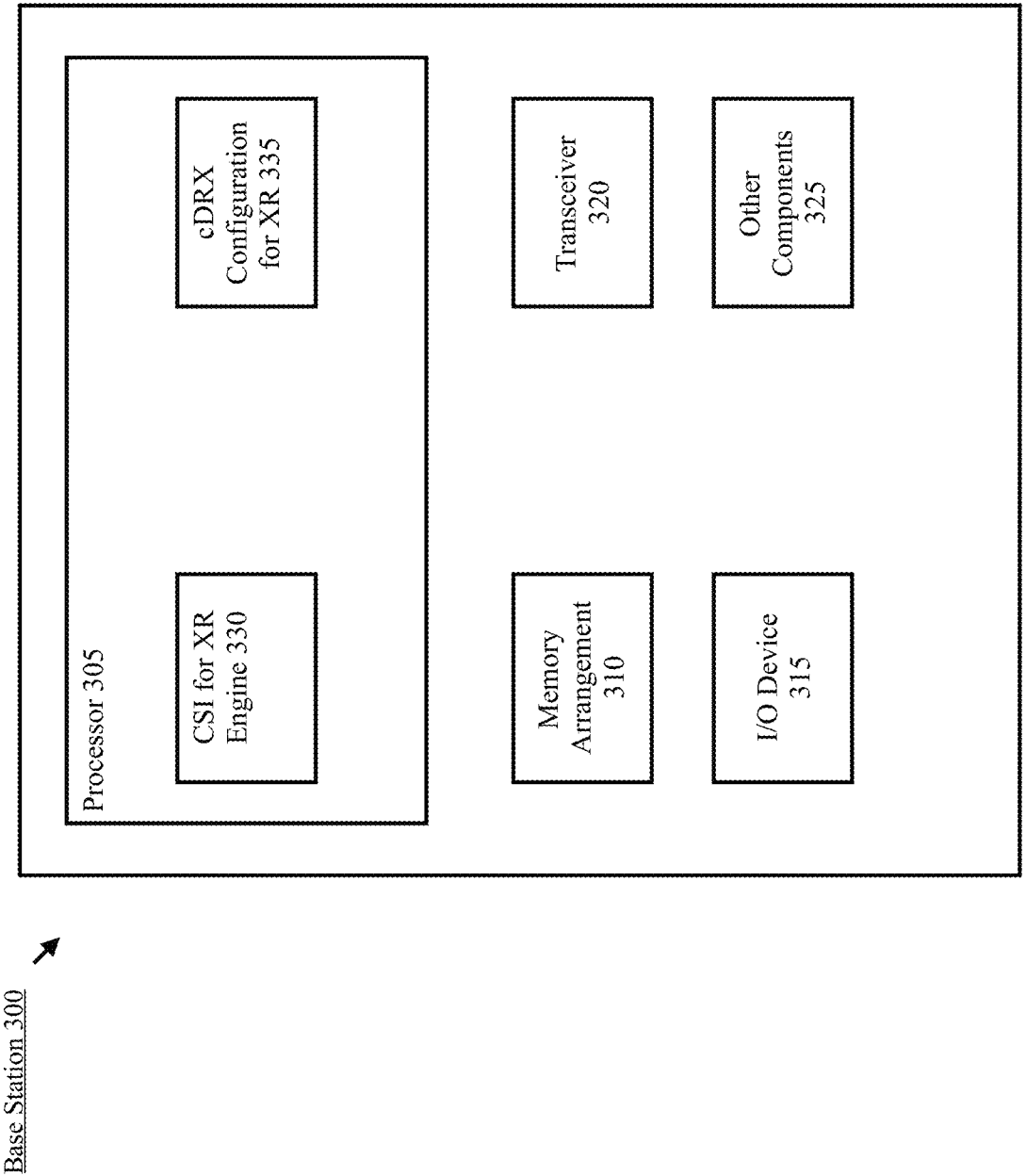
FIG. 3 shows an exemplary base station according to various exemplary embodiments.

FIG. 3 shows an exemplary base station 300 according to various exemplary embodiments. The base station 300 may represent any access node (e.g., gNB 120A, etc.) through which the UE 110 may establish a connection and manage network operations.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engines may include a CSI for XR engine 330 and a cDRX configuration for XR engine 335. The CSI for XR engine 330 may perform various operations related to the exemplary CSI feedback enhancements described herein. The operations may include but are not limited to, transmitting CSI feedback configurations information, transmitting CSI resources and receiving CSI feedback. The cDRX configuration for XR engine 335 may perform various operations related to the exemplary cDRX enhancements described herein. The operations may include, but are not limited to, transmitting cDRX configurations information and transmitting PDCCH in accordance with the cDRX configuration.

The above noted engines 330, 335 being an application (e.g., a program) executed by the processor 305 is only exemplary. The functionality associated with the engines 330, 335 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

Figure 4:
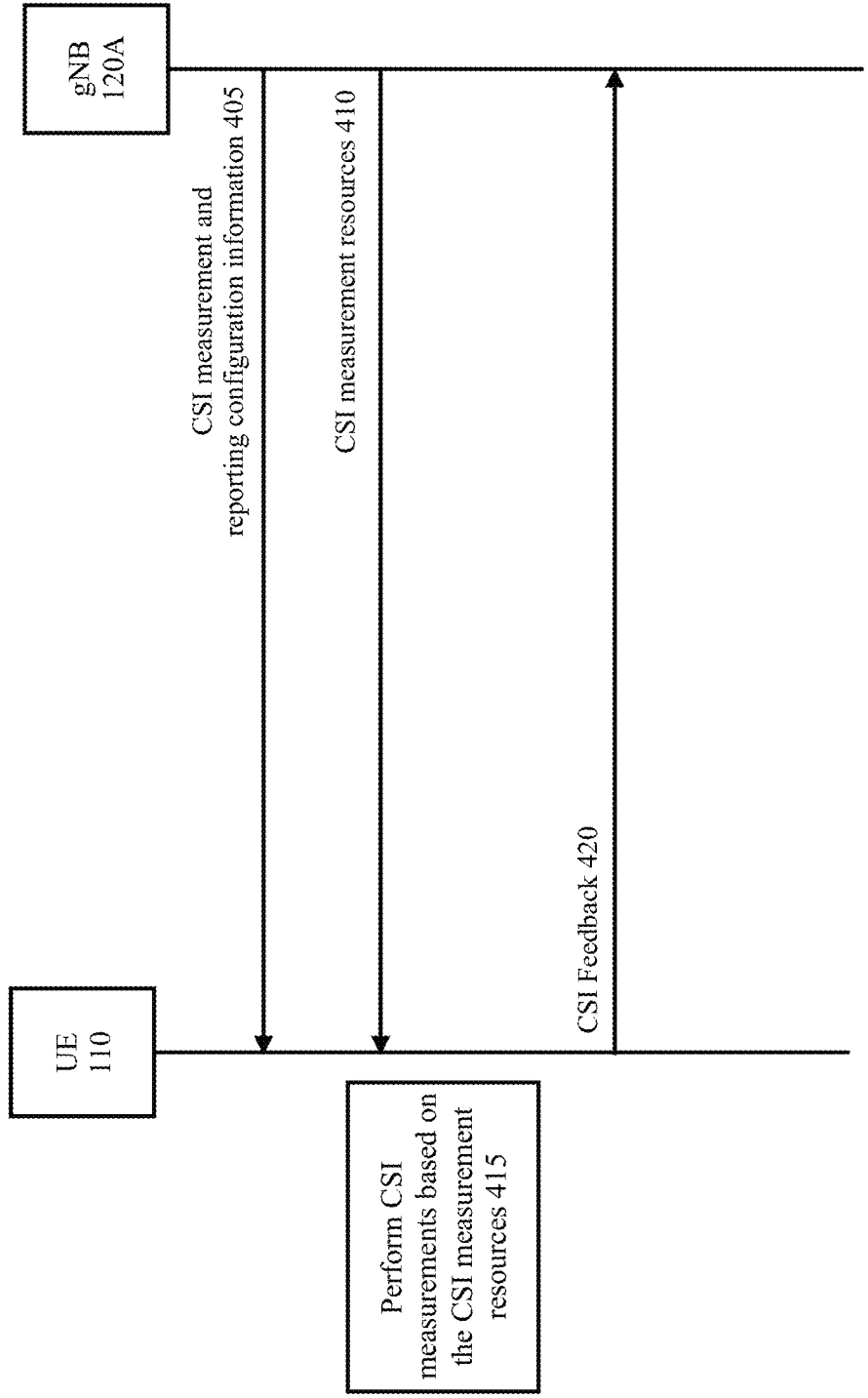
FIG. 4 shows a signaling diagram of channel state information (CSI) feedback for eXtended reality (XR) according to various exemplary embodiments.

As mentioned above, in one aspect, the exemplary embodiments introduce CSI feedback enhancements for XR. FIG. 4 shows a signaling diagram 400 of CSI feedback for XR according to various exemplary embodiments. The signaling diagram 400 is described with regard to the network arrangement 100 of FIG. 1 and the UE 110 of FIG. 2.

The signaling diagram 400 includes the UE 110 and the gNB 120A. In 405, the UE 110 receives CSI measurement and/or reporting configuration information. In some embodiments, the CSI measurement and/or reporting configuration information may be provided to the UE 110 in one or more radio resource control (RRC) messages. In other embodiments, the CSI measurement and/or reporting configuration information may be provided to the UE 110 in one or more access control (MAC) control elements (CEs). However, the exemplary embodiments are not limited to RRC messages or MAC CEs, the CSI measurement and reporting configuration information may be provided to the UE 110 in any appropriate manner.

Various CSI feedback enhancements for XR will be described in detail below. Subsequently, examples of how the network may provide the UE 110 with the corresponding CSI measurement and reporting configuration information will be provided.

In 410, the gNB 120A configures CSI measurement resources to the UE 110. CSI resources may include channel measurement resources (CMR) and interference measurement resources (IMR). The CMRs may include one or more non-zero power (NZP) CSI-reference signals (RS). In NR, periodic and semi-persistent CMRs are supported. The periodicity and offset of these CMRs resources may be characterized in slots or in any other appropriate manner. Throughout this description, any reference to a particular type of CMR is merely provided for illustrative purposes, the exemplary embodiments may apply to any appropriate type of CMR.

The IMRs may include one or more zero power (ZP)-CSI-RS, NZP-CSI-RS or a combination thereof. Throughout this description, the terms "ZP IMR" and "CSI-IM" may be used interchangeably to identify the same type of CSI resources and "IMR" may refer to "ZP IMR," "NZP IMR" or a combination of "ZP IMR" and NZP IMR.". In NR, periodic and semi-persistent IMRs are supported. The periodicity and offset of these IMRs may be characterized in slots or in any other appropriate manner. Throughout this description, any reference to a particular type of IMR is merely provided for illustrative purposes, the exemplary embodiments may apply to any appropriate type of IMR.

In 415, the UE 110 performs CSI measurements based on the CSI measurement resources. In 420, the UE 110 reports CSI feedback to the gNB 120A.

For XR service, the stream may be generated at cadences which are not integer multiples of NR units of time. To provide one example, XR video stream generation may occur at 60 or 120 frames per second. The exemplary embodiments introduce CSI measurement and reporting techniques to handle these types of timing issues in an efficient manner.

In some embodiments, the exemplary enhancements may be applied to only IMR. For example, periodic/semi-persistent CMR may be generated at a periodicity of X milliseconds (ms) where X represents an integer value (e.g., 1, 2, 5, 10, etc.) while periodic/semi-persistent IMR may be generated at a periodicity of Y ms where Y represents a non-integer value (e.g., 25/3, 10/3, etc.). In another embodiments, the exemplary enhancements may be applied to only CMR. In a further embodiment, the exemplary enhancements may be applied to both CMR and IMR.

Figure 5:
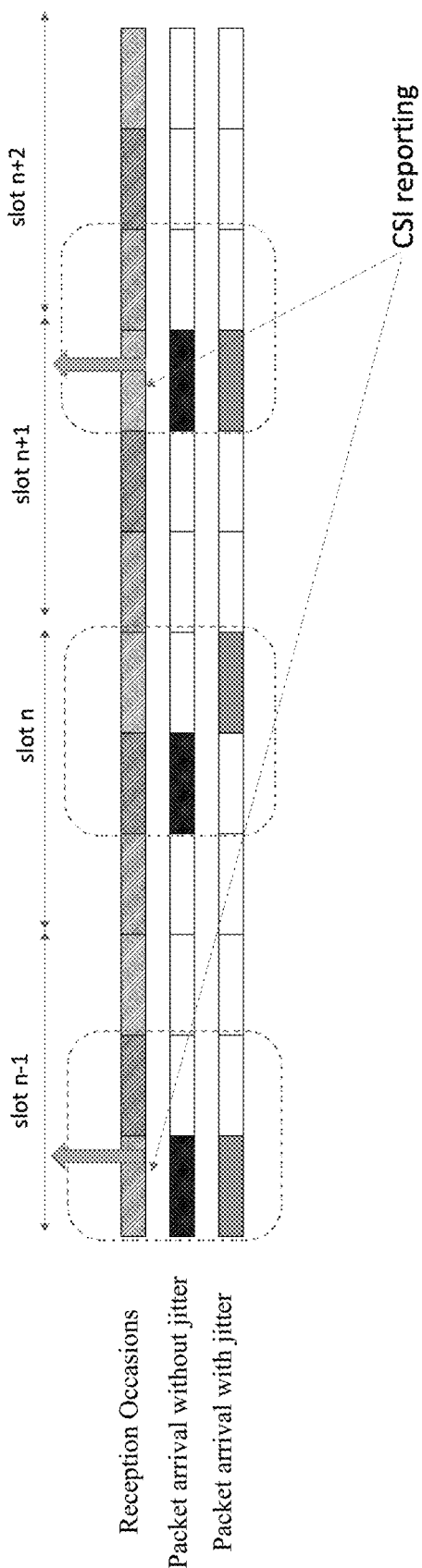
FIG. 5 shows an example of CSI reporting every two downlink (DL) semi-persistent scheduling (SPS) reception occasions.

In one example, the periodicity of the CSI reporting may be the same as the DL SPS periodicity or a multiple of the DL periodicity. The periodicity of the CSI reporting may be non-integer. FIG. 5 shows an example of CSI reporting every two DL SPS reception occasions.

Figure 6:
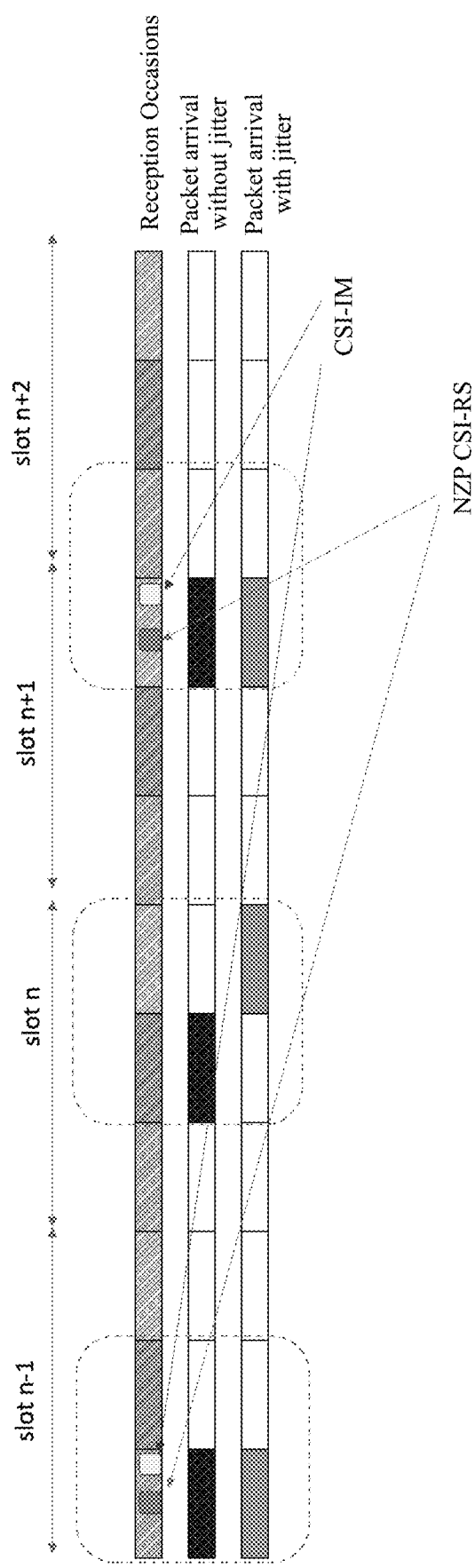
FIG. 6 shows an example of CSI measurement resources configured as a multiple of the DL SPS periodicity.

The periodicity of the CSI measurement resource may also be non-integer and based on the DL SPS periodicity or a multiple of the DL periodicity. For example, the CSI measurement resource periodicity may be represented by (M1/M2) where M1 and M2 each represent an integer value. FIG. 6 shows an example of CSI measurement resources configured as a multiple of the DL SPS periodicity.

To enable periodic and semi-persistent CSI reporting with non-integer periodicity and offset, the CSI reporting and/or measurement configuration information may include an indication of the M1 integer, the M2 integer and an offset integer. FIG. 7 shows an example CSI-ReportPeriodicityAndOffset RRC parameter configured to include an indication of the supported non-integer periodicity and offset.

To indicate to the UE 110 the non-integer periodicity and offset for the CMR configuration, the CSI reporting and measurement configuration information may include an indication of the M1 integer, the M2 integer and an offset integer. FIG. 8 shows an example CSI-ResourcePeriodicityAndOffset RRC parameter configured to include an indication of the supported non-integer periodicity and offset for periodic and semi-persistent NZP CSI-RS.

To indicate to the UE 110 the non-integer periodicity and offset for the IMR configuration, the CSI reporting and measurement configuration information may include an indication of the M1 integer, the M2 integer and an offset integer. FIG. 9 shows an example CSI-ResourcePeriodicityAndOffset RRC parameter configured to include an indication of the supported non-integer periodicity and offset for periodic and semi-persistent CSI-IM.

In some embodiments, an association between the DL SPS configuration and the CSI measurement and reporting configuration may be implemented. In one example, the CSI reporting and measurement configuration is associated with the DL SPS configuration. Thus, in this example, the UE 110 may receive DL SPS configuration information and then determine the CSI measurement and reporting configuration based on the preconfigured association. In another example, the DL SPS configuration is associated with the CSI measurement and reporting configurations. Thus, in this example, the UE 110 may receive the CSI measurement and reporting configuration information and then determine the DL SPS configuration based on the preconfigured association. In a further example, an information element (IE) may be introduced that indicates to the UE 110 a relationship between the DL SPS configuration and the CSI measurement and reporting configuration.

For the exemplary enhancements to the CSI measurement resources, it may be beneficial to restrict the presence of CSI-RS to the DL SPS PDSCH. In some embodiments, the CSI-FrequencyOccupation RRC parameter is not explicitly configured according to the DL SPS PDSCH frequency allocation. Instead, the UE 110 may adapt the CSI measurement operations to the DL SPS PDSCH configuration. This allows these enhancements to be implemented without creating additional RRC signaling overhead.

Further, in some embodiments, the CSI-ReportingBand RRC parameter is not explicitly configured according to the DL SPS PDSCH frequency allocation. Instead, the UE 110 may adapt the CSI reporting operations to the DL SPS PDSCH configuration. For example, if the PDSCH is from physical resource block (PRB) 10 to PRB 19, then CSI measurement is assumed for a CSI subband or subbands enclosed in the PDSCH only. This allows these enhancements to be implemented without additional RRC signaling overhead.

In some embodiments, an association of wideband and subband CSI and PDCSCH resource allocation may be implemented. For example, PDSCH may support two resource allocation types, e.g., Type 0 and Type 1. For Type 1, if interleaving is configured, this may indicate to the UE 110 that wideband CSI feedback is to be performed. For Type 1, if interleaving is not used, this may indicate to the UE 110 that PDSCH allocation is to be quantized according to the CSI subband size and subband CSI feedback is to be performed. When Type 0 is configured, this may indicate to the UE 110 that wideband feedback is to be performed. Thus, the PDSCH resource allocation type may indicate to the UE 110 how the CSI feedback is to be reported.

Figure 10:
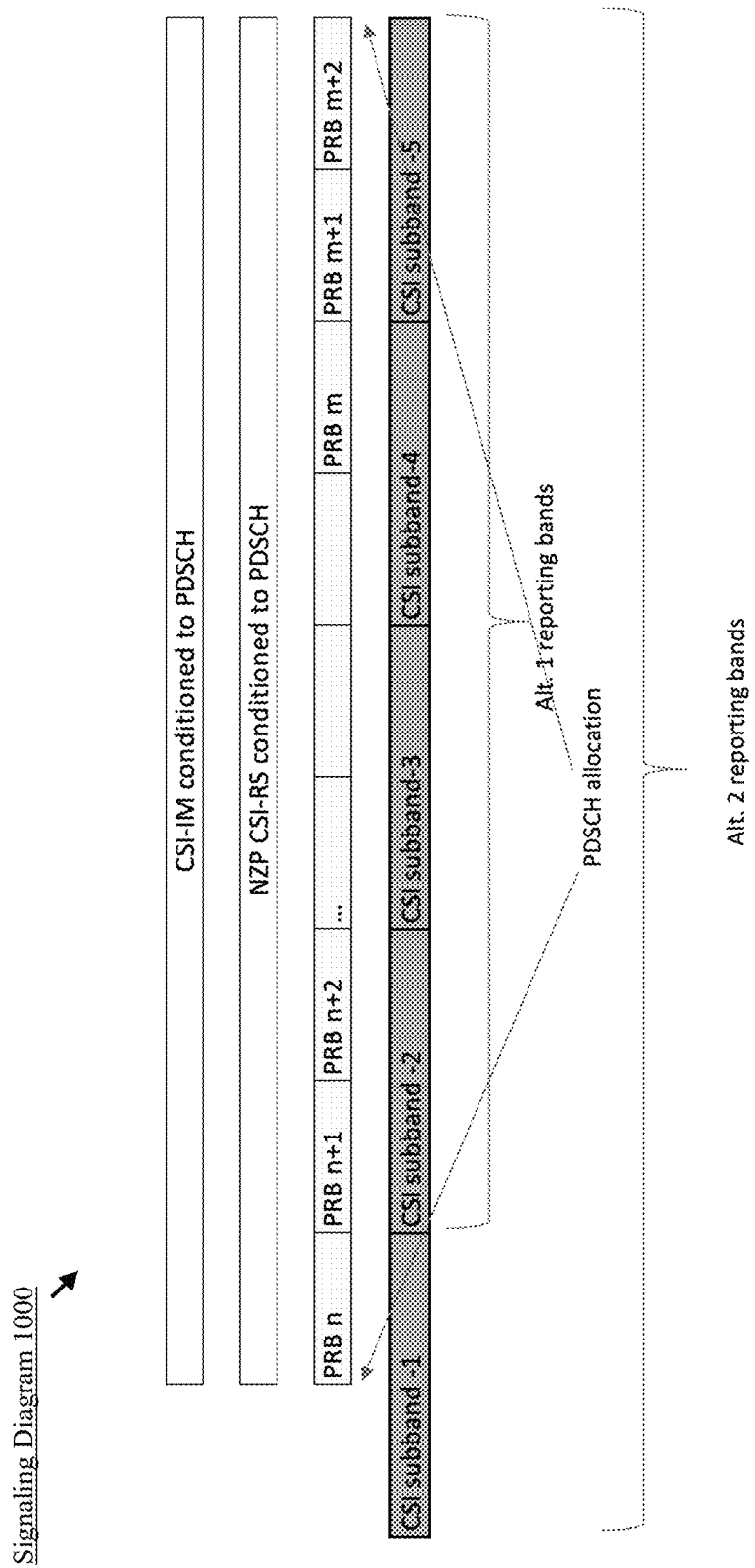
FIG. 10 shows an example of the relationship between physical downlink shared channel (PDSCH) allocation, CSI measurement and CSI reporting according to various exemplary embodiments.

FIG. 10 shows an example 1000 of the relationship between PDSCH allocation, CSI measurement and CSI reporting according to carious exemplary embodiments. In the example 1000, the NZP CSI-RS and CSI-IM are limited to PRBs with PDSCH allocation. Thus, the NZP CSI-RS and the CSI-IM may be conditioned to the PDSCH. However, the exemplary embodiments are not limited to this arrangement. In other embodiments, the NZP CSI-RS and CSI-IM may be found outside the PRBs with PDSCH allocation.

The example 1000 shows two alternatives for CSI reporting. In alternative one, the reporting subbands may be the CSI subbands that completely overlap PRBs with PDCSH allocation. In alternative two, the reporting subbands may be any CSI subband that overlaps PRBs with PDSCH allocation. In some embodiments, extension to PRB n may be implemented for SCI subband-2.

Since the CSI timing may be configured to align with the traffic periodicity, in some embodiments, the hybrid automatic repeat request (HARQ) feedback timing may also be aligned with the traffic periodicity. Accordingly, periodic CSI feedback, semi-persistent CSI feedback or the exemplary CSI feedback triggered by DL SPS activation may be transmitted to the gNB 120A together with the HARQ feedback. This allows the UL transmission time duration to be minimized because instead of two separate PUCCH transmissions, one for CSI feedback and one for HARQ feedback, both CSI feedback and HARQ with their periodicity matched to the DL traffic can be sent in the same PUCCH. Thus, the CSI feedback may be multiplexed with the HARQ feedback on a PUCCH transmission that is matched to the periodicity of the DL traffic.

In addition, sounding reference signals (SRS) may be configured with a non-integer periodicity and offset. Those skilled in the art will understand that SRS generally refers to an uplink reference signal that may be used by a base station (e.g., gNB 120A) to estimate channel quality. SRS may be configured in a periodic or a semi-persistent manner. Further SRS for positioning may also be configured. The exemplary embodiments apply to periodic SRS, semi-persistent SRS or any other appropriate type of SRS.

The exemplary embodiments introduce a periodicity and offset for SRS transmission that is configured to match the periodicity of XR traffic. In some embodiments, the periodicity and offset for SRS may be matched with downlink traffic arrival. This may facilitate coordinated beamforming. In other embodiments, the periodicity and offset may be matched with uplink traffic so one transmission (e.g., SRS appended or prepended to the PUSCH) or two narrowly spaced transmissions of SRS and PUSCH may be supported.

To indicate to the UE 110 the non-integer periodicity and offset for the SRS configuration, the base station may transmit SRS configuration information to the UE 110 using one or more RRC messages. The SRS configuration information may include an indication of the M1 integer, the M2 integer and an offset integer. FIG. 14 shows an example of an SRS-PeriodicityandOffset RRC parameter configured to include an indication of the supported non-integer periodicity and offset for SRS.

Alternatively, instead of M1 and M2 integers, the SRS configuration information may include a time parameter indicating a frequency at which SRS is to be transmitted. FIG. 15 shows an example of SRS-PeriodicityandOffset RRC parameter configured to include an indication of the supported non-integer periodicity and offset for SRS.

In some embodiments, the CSI feedback may be fully or partially based on the PDSCH demodulation reference signal (DMRS). When CSI feedback is based on PDSCH DMRS, the CMR may be provided by the DMRS of the scheduled PDSCH or configured PDSCH (e.g., SPS). The IMR may be provided either by un-used tones in a code division multiplexing (CDM) group of the DMRS or by ZP IMR and/or NZP IMR. The UE 110 may calculate channel quality indicator (CQI) according to the CMR and/or IMRs. Further, if PDSCH is at a rank larger than 1, then the UE 110 may also recommend rank adaption. For example, if the PDSCH is at rank 3, the UE 110 may report a rank indicator (RI) of 1, 2 or 3 in the feedback.

In another aspect, the exemplary embodiments relate to cDRX for XR. Those skilled in the art will understand that cDRX is a power saving mechanism implemented by the UE 110 in RRC connected state. The cDRX cycle may comprise an onDuration during which the UE 110 is scheduled to monitor the PDCCH. Outside of the onDuration, the UE 110 may have an opportunity to utilize a sleep mode of inactivity and conserve power. Throughout this description, reference to a power saving mode or a sleep mode of inactivity does not necessarily mean putting the processor 205, the transmitter, and the receiver of the UE 110 to sleep, in hibernation, or in deactivation. For example, the processor 205 (e.g., baseband and/or application) may continue to execute other applications or processes. The sleep mode of inactivity relates to conserving power by discontinuing a continuous processing functionality relating to operations that enable the UE 110 to receive data that may be transmitted to the UE 110 and transmit data to the network. The exemplary embodiments include enhancements for adapting cDRX to XR traffic which may be generated with a non-integer periodicity.

As indicated above, in NR, there may be DL traffic configured with a non-integer periodicity. For example, in XR, audio and video streams may be generated at cadences which are not integer multiples of NR's default timing. In one configuration of DL traffic with non-integer periodicity, the UE 110 may expect SPS transmissions from the network at slot mod(g(k), $N_{SlotPerRadioFrame}$) where $$g(k) = f\left(\frac{M_1}{M_2} \times k\right) + I_{shift}$$

and k is a running index. In addition, there may be an initial offset characterized in slots and two integers to derive the periodicity $M_1$ and $M_2$. In some embodiments, when jitter is expected, SPS configuration may be adjusted with the jitter range. However, the above referenced DL traffic characteristics are merely provided for illustrative purposes. The exemplary embodiments may be applicable to DL traffic configured with non-integer periodicity in any appropriate manner.

In a TDD system, there may be DL slots, UL slots and mixed slots (with both DL and UL symbols) in a radio frame. In some embodiments, a symbol may be a semi-statically configured as a DL symbol (e.g., semi-static DL symbol), semi-statically configured as an UL symbol (e.g., semi-static UL symbol) or semi-statically configured as a flexible symbol. If an occasion for DRX, CSI measurement or SR transmission with a non-integer periodicity configuration is configured to collide with an UL slot or at least one static/semi-statical UL symbol in a slot, then the occasion may be deferred to the next available occasion which does not collide with any semi-static UL symbol. If an occasion for CSI feedback with non-integer periodicity is configured to collide with an UL slot or at least one semi-statical DL symbol in a slot, then the occasion may be deferred to the next available occasion which does not collide with any semi-static DL symbol.

Figure 11:
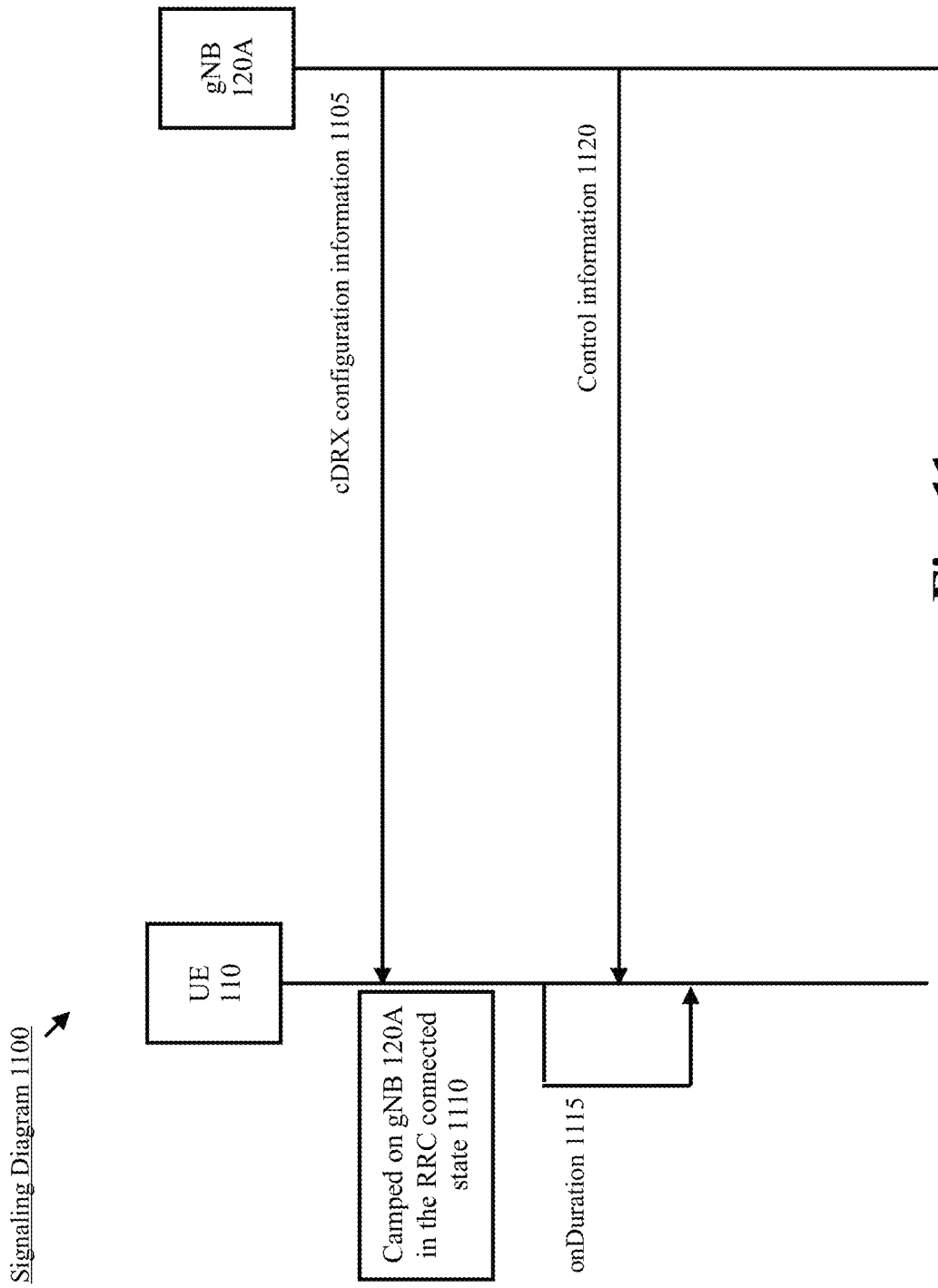
FIG. 11 shows a signaling diagram for implementing a connected discontinuous reception (cDRX) cycle for DL traffic configured with non-integer periodicity according to various exemplary embodiments.

FIG. 11 shows a signaling diagram 1100 for implementing a cDRX cycle for DL traffic configured with non-integer periodicity according to various exemplary embodiments.

In 1105, the UE 110 receives cDRX configuration information. This configuration information may indicate to the UE 110 the configuration of a cDRX cycle for DL traffic configured with non-integer periodicity. In 1110, the UE 110 is camped on the gNB 120A in the RRC connected state and implements the cDRX cycle.

In 1115, an onDuration of the cDRX cycle occurs. In 1120, during the onDuration, the gNB 120A transmits control information to the UE 110 over the PDCCH. This control information may indicate to the UE 110 that a subsequent data reception or a subsequent transmission is scheduled.

To define a non-integer cDRX cycle, an additional long DRX value may be added to the DRX-config RRC parameter. For example, the long DRX value may be 1000/60 which is equal to 50/3 for 60 frames per second. In another example, the long DRX value may be 1000/45 which is equal to 200/9 for 45 frames per second. However, these values are merely provided for illustrative purposes, any appropriate value may be utilized.

Under conventional circumstances, DRX frames may be calculated using a subframe number (SFN) and a DRX offset value. Here, the conventional DRX cycle may be modified within one SFN periodicity as floor([(SFN×10)+subframe number]modulo(drxLongCycle))=drxStartOffset. In some embodiments, this floor function may be rounded or a ceil function may be used. The DRX cycle may be derived based on SFN value where SFN is 10 bit with a range of [0, 1023]. Therefore, at SFN wraparound, there may be an issue as show in the below example:

SFN=1022, 1023, 0, 1, 2, using floor function, $$DRX \text{ cycle} = \frac{50}{3}, DRX \text{ offset} = 0;$$

This results in floor $$\left(\text{mod}\left([10220{:}10239, 0{:}20], \frac{50}{3}\right)\right) = [3\ 4\ 5\ 6\ 7\ 8\ 9\ 10\ 11\ 12\ 13\ 14\ 15\ 16$$

$$0\ 1\ 2\ 3\ 4\ 5\ 0\ 1\ 2\ 3\ 4\ 5\ 6\ 7\ 8\ 9\ 10\ 11\ 12\ 13\ 14\ 15\ 16\ 0\ 1\ 2\ 3]$$

In one embodiment, the cDRX cycle may be derived using hyper-frame number (HFN)+SFN. This may not entirely eliminate the SFN wraparound issues but may mitigate the severity. The cDRX cycle may be represented as floor([(HFN×10240+SFN×10)+subframe number]modulo (drxLongCycle))=drxStartOffset.

In some embodiments, for the SFN and HFN wrap around issue, the gNB 120A may send a MAC CE to indicate the change of drxStartOffset when needed. For instance, within the context of the example provided above where DRX offset=0, at wrap around, the GNB 120A may instruct the UE 110 to switch the drxStartOffset to 11. Alternatively, a MAC CE may be sent in a broadcast or groupcast to multiple UEs since the SFN wrap is cell specific. In another alternative, UE 110 and the gNB 120A may be preconfigured with a non-integer DRX cycle adjustment parameter to autonomously adjust the DRX offset following the same rule.

Figure 12:
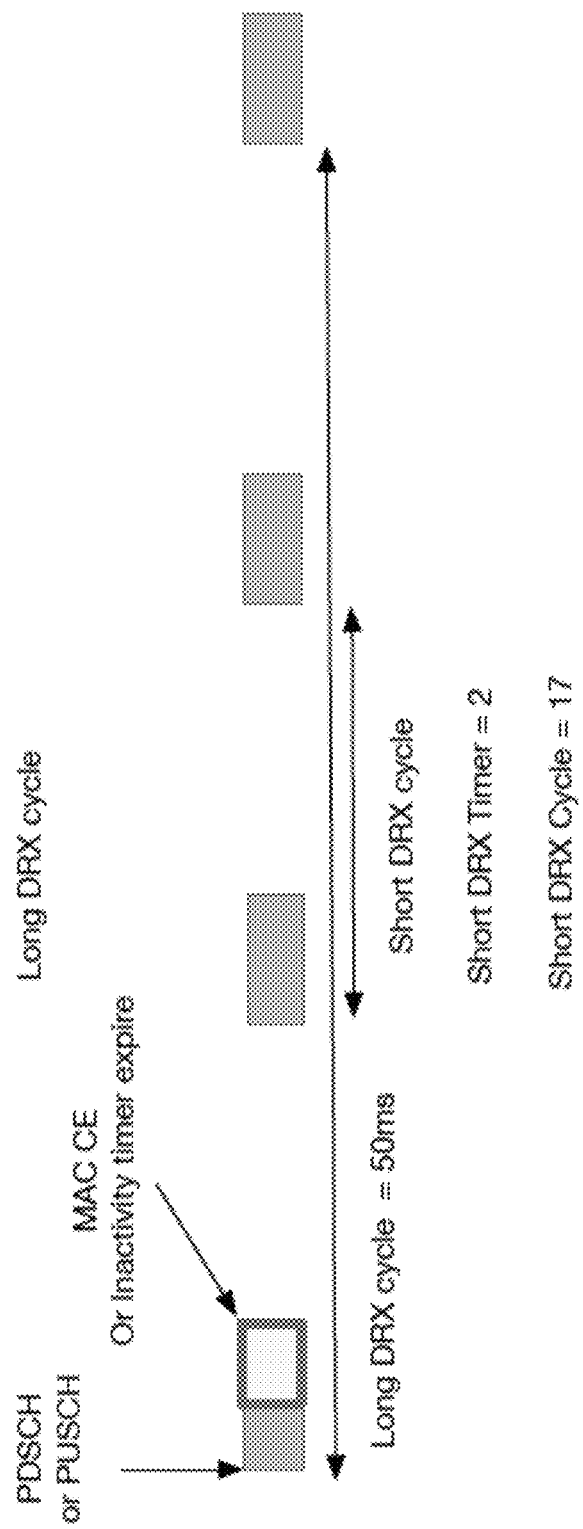
FIG. 12 shows an example of using a combination of long DRX and short DRX to match DL traffic periodicity.

In a different approach, a combination of long DRX and short DRX may be used to match DL traffic periodicity. FIG. 12 shows an example of using a combination of long DRX and short DRX to match DL traffic periodicity.

The example shown in FIG. 12 uses 60 frames per second as an example (e.g., 1000/60=50/3) and thus, the long DRX cycle may be set to 50. The short DRX timer may be set to 2, which indicates that there are 2 short DRX cycles within 1 long DRX cycle. When the drx inactivity timer expires or a DRX command MAC CE is received by the UE 110, if the short cycle is used, the cycle may be represented by {[SFN× 10)+subframe number]modulo (drxLongCycle)} modulo (drxShortCycle)=(drxStartOffset) modulo (drx Short Cycle).

If the MAC entity is in active time, the UE 110 may monitor the PDCCH in the normal manner. If the PDCCH indicates a new transmission (DL or UL), then the drx inactivity timer is to be started or restarted in the first symbol after the end of the PDCCH reception. In case of SPS or configured grant (CG) XR traffic, the drx inactivity timer may start as well in order to start the short DRX cycle. Thus, as shown in FIG. 12, the MAC procedure may enable the start of the drx inactivity timer with PDSCH reception and PUSCH transmission.

With a 50 ms long DRX cycle, there may be wrap around issues. The techniques described above may also be applied in this instance to mitigate the wrap around issues. For instance, HFN may be utilized so the time to start the long DRX cycle and the short DRX cycle may be represented by ([(HFN×10240+SFN×10)+subframe number]modulo (drxLongCycle))=drxStartOffset and {[HFN×10240+(SFN× 10)+subframe number]modulo (drxLongCycle)}modulo drx ShortCycle=(drxStartOffset)modulo (drx Short Cycle)

Here, at SFN or HFN wrap around, the drxStartOffset may be shifted. For example, drxStartOffset=0, drxLongCycle=50, drxShortCycle=17 at the SFN wrap around, drxStartOffset is changed from 0 to 11 to equal [3 4 5 6 7 8 9 10 11 12 13 14 15 16 0 1 2 3 4 5 0 1 2 3 4 5 6 7 8 9 10 11 12 13 14 15 16 0 1 2 3 4 5 6 7 8 9 10 11 12 13 14 15 16 0 1 2 3 4 5 6 7 8 9]

Figure 13:
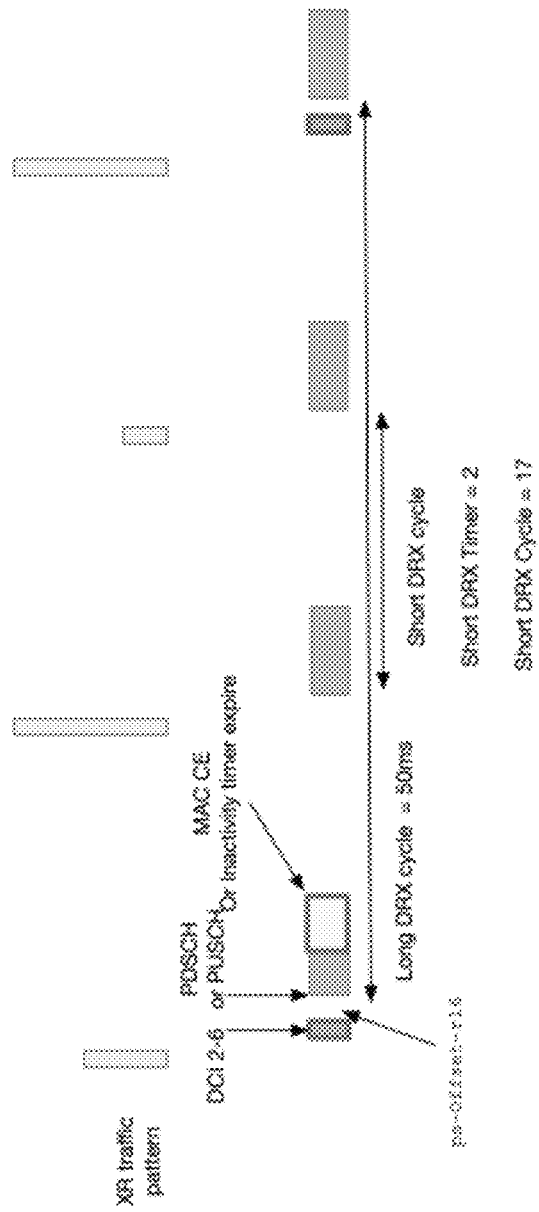
FIG. 13 shows an example of using physical downlink control channel (PDCCH) wake-up signal (WUS) to indicate dynamic traffic according to various exemplary embodiments.

In another approach, a PDCCH WUS may be used to indicated dynamic traffic. FIG. 13 shows an example of using PDCCH WUS to indicate dynamic traffic according to various exemplary embodiments.

Under conventional circumstances, if the UE 110 detects a PDCCH WUS (e.g., downlink control information (DCI) format 2-6) and the PDCCH WUS indicated no wakeup, the UE 110 may skip the DRX cycle. That is, instead of monitoring the PDCCH during an onDuration, the UE 110 may utilize the sleep mode of inactivity. However, in XR, the UE 110 may wakeup every DRX cycle when the DRX cycle matches the traffic periodicity.

The exemplary embodiments use the field within the PDCCH WUS to indicate additional information for the SPS PDSCH and CG PUSCH. For example, differential modulation and coding scheme (MCS) compared to SPS can be sent per UE to adapt the modulation/coding rate on top of the SPS configuration. In another example, the PDCCH WUS may be used to indicate an extension to the resource allocation when packets are relatively large for this DRX cycle.

When adapting the PDCCH WUS, if only long DRX is used, the PDCCH WUS may be transmitted before every DRX and either MCS or resource size for SPS and CG can be adopted before the DRX onDuration. In another embodiment, PDCCH WUS may not be transmitted before short DRX. In this example, at least MCS adaption can be used for all DRX onDurations within the long/short DRX cycle. FIG. 13 shows a gNB configuration to align XR traffic before PDCCH WUS is transmitted.

EXAMPLES

In a first example a user equipment (UE) comprises a transceiver configured to communicate with a network and a processor communicatively coupled to the transceiver and configured to perform operations comprising receiving channel state information (CSI) configuration information corresponding to downlink new radio (NR) traffic with non-integer periodicity, wherein the CSI configuration information includes one of CSI measurement configuration information, CSI reporting configuration information or CSI measurement configuration information and CSI reporting configuration information, receiving CSI measurement resources and reporting CSI feedback to a network.

In a second example a base station comprises a transceiver configured to communicate with a user equipment (UE) and a processor communicatively coupled to the transceiver and configured to perform operations comprising transmitting channel state information (CSI) configuration information corresponding to downlink new radio (NR) traffic with non-integer periodicity to a user equipment (UE), wherein the CSI configuration information includes one or more of CSI measurement configuration information and CSI reporting configuration information, transmitting CSI measurement resources and receiving CSI feedback from the UE.

In a third example a user equipment (UE) comprises a transceiver configured to communicate with a network and a processor communicatively coupled to the transceiver and configured to perform operations comprising receiving connected discontinuous reception (cDRX) configuration information for downlink new radio (NR) traffic with non-integer periodicity, implementing a cDRX cycle based on the configuration information and receiving physical downlink control channel (PDCCH) during an onDuration of the cDRX cycle.

In a fourth example a base station comprises a transceiver configured to communicate with a user equipment (UE) and a processor communicatively coupled to the transceiver and configured to perform operations comprising transmitting connected discontinuous reception (cDRX) configuration information for downlink new radio (NR) traffic with non-integer periodicity to a user equipment (UE) and transmitting physical downlink control channel (PDCCH) during an onDuration of a cDRX cycle implemented by the UE.

In a fifth example, a processor of a user equipment (UE) is configured to perform operations comprising receiving sounding reference signal (SRS) configuration information corresponding to new radio (NR) traffic with non-integer periodicity and transmitting SRS to a base station of a network.

In a sixth example, the processor of the fifth example, wherein the periodicity of the SRS is a non-integer periodicity configured based on downlink traffic.

In a seventh example, the processor of the fifth example, wherein the periodicity of the SRS is a non-integer periodicity configured based on uplink traffic.

In an eighth example, the processor of the seventh example, wherein the SRS is appended or prepended to a physical uplink shared channel (PUSCH).

In a ninth example, the processor of the eighth example, wherein the PUSCH is a configured grant PUCSH.

In a tenth example, the processor of the fifth example, wherein the SRS configuration information is included in an RRC message comprising a first integer, a second integer and an offset integer.

In an eleventh example, the processor of the fifth example, wherein the SRS configuration information is included in an RRC message comprising a time based parameter indicating a frequency at which SRS is to be transmitted and an offset integer.

In a twelfth example, a processor of a base station is configured to perform operations comprising transmitting connected discontinuous reception (cDRX) configuration information for downlink new radio (NR) traffic with non-integer periodicity to a user equipment (UE) and transmitting physical downlink control channel (PDCCH) during an onDuration of a cDRX cycle implemented by the UE.

In a thirteenth example, the processor of the twelfth example, the operations further comprising transmitting a medium access control (MAC) control element (CE) indicating a change to a drxStartOffset.

In a fourteenth example, the processor of the thirteenth example, wherein the MAC CE is sent in a broadcast or a groupcast.

In a fifteenth example, the processor of the twelfth example, wherein the cDRX cycle includes a combination of a short DRX cycle and a long DRX cycle.

In a sixteenth example, the processor of the twelfth example, the operations further comprising transmitting a PDCCH wake up signal (WUS), wherein the PDCCH WUS comprises information for semi-persistent scheduling (SPS) physical downlink shared channel (PDCCH).

In a seventeenth example, the processor of the sixteenth example, wherein the information comprises a differential modulation and coding scheme (MCS) or an indication to extend the resource allocation.

In an eighteenth example, the processor of the twelfth example, the operations further comprising transmitting a PDCCH wake up signal (WUS), wherein the PDCCH WUS comprises information for configured grant (CG) physical uplink shared channel (PUSCH).

In a nineteenth example, the processor of the twelfth example, the operations further comprising transmitting a PDCCH wake up signal (WUS), wherein downlink traffic is aligned before the PDCCH WUS.

In a twentieth example, a processor of a user equipment (UE) is configured to perform operations comprising receiving channel state information (CSI) configuration information corresponding to downlink new radio (NR) traffic with non-integer periodicity, wherein the CSI configuration information includes one of CSI measurement configuration information, CSI reporting configuration information or CSI measurement configuration information and CSI reporting configuration information, receiving CSI measurement resources; and reporting CSI feedback to a network.

In a twenty first example, the processor of the twentieth example, the operations further comprising identifying Type 1 physical downlink shared channel (PDSCH) resource allocation with interleaving or Type 0 PDSCH resource allocation and determining that wideband CSI feedback is to be used based on the identifying.

In a twenty second example, the processor of the twentieth example, the operations further comprising identifying Type 1 physical downlink shared channel (PDSCH) resource allocation without interleaving and determining that subband CSI feedback is to be used based on the identifying.

In a twenty third example, the processor of the twentieth example, wherein the CSI measurement resources are limited to physical resource blocks (PRBs) with physical downlink shared channel (PDSCH) allocation.

In a twenty fourth example, the processor of the twentieth example, wherein reporting the CSI feedback includes multiplexing the CSI feedback and hybrid automatic repeat request (HARQ) feedback.

In a twenty fifth example, the processor of the twentieth example, wherein the channel measurement resources (CMRs) are provided by demodulation reference signals (DMRS).

In a twenty sixth example, the processor of the twentieth example, wherein the interference measurement resources (IMRs) are provided by one of unused tones in a code division multiplexing (CDM) group of demodulation reference signals (DMRS), zero power (ZP) IMR or non-zero power (NZP) IMR.

In a twenty seventh example, a processor of a base station is configured to perform operations comprising transmitting channel state information (CSI) configuration information corresponding to downlink new radio (NR) traffic with non-integer periodicity to a user equipment (UE), wherein the CSI configuration information includes one or more of CSI measurement configuration information and CSI reporting configuration information, transmitting CSI measurement resources and receiving CSI feedback from the UE.

In a twenty eighth example, the processor of the twenty seventh example, wherein the CSI measurement and reporting configuration information is included in a radio resource control (RRC) message comprising a first integer, a second integer and an offset integer and wherein the first integer and the second integer are to be used by the UE to derive a non-integer CSI reporting periodicity.

In a twenty ninth example, the processor of the twenty eighth example, wherein the CSI measurement and reporting configuration information is included in a radio resource control (RRC) message comprising a first integer, a second integer and an offset integer and wherein the first integer and the second integer are used to by the UE to derive a non-integer periodicity for channel measurement resources (CMR).

In a thirtieth example, the processor of the twenty eighth example, wherein the CSI measurement and reporting configuration information is included in a radio resource control (RRC) message comprising a first integer, a second integer and an offset integer and wherein the first integer and the second integer are used to by the UE derive a non-integer periodicity for interference measurement resources (IMR).

In a thirty first example, the processor of the twenty eighth example, the operations further comprising transmitting an information element (IE) to the UE indicating a relationship between downlink semi-persistent scheduling (SPS) and CSI measurement and reporting occasions.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving channel state information (CSI) configuration information corresponding to downlink new radio (NR) traffic with non-integer periodicity, wherein the CSI configuration information includes one of CSI measurement configuration information, CSI reporting configuration information or CSI measurement configuration information and CSI reporting configuration information;
   receiving CSI measurement resources; and
   reporting CSI feedback to a network.

2. The processor of claim 1, wherein the CSI measurement resources comprise channel measurement resources (CMRs) and interference measurement resources (IMRs) and the IMRs are transmitted by the network with non-integer periodicity.

3. The processor of claim 1, wherein the periodicity of the CSI reporting is a non-integer periodicity based on a downlink semi-persistent scheduling (SPS) periodicity.

4. The processor of claim 1, wherein the periodicity of the CSI reporting is a non-integer periodicity based on one or more downlink semi-persistent scheduling (SPS) periodicities.

5. The processor of claim 1, wherein the periodicity of the CSI measurement resources is a non-integer periodicity based on one or more downlink semi-persistent scheduling (SPS) periodicities.

6. The processor of claim 1, wherein the CSI configuration information included in a radio resource control (RRC) message comprising a first integer, a second integer and an offset integer and wherein the first integer and the second integer are used to derive a non-integer CSI reporting periodicity.

7. The processor of claim 1, wherein the CSI configuration information is included in a radio resource control (RRC) message comprising a first integer, a second integer and an offset integer and wherein the first integer and the second integer are used to derive a non-integer periodicity for channel measurement resources (CMR).

8. The processor of claim 1, wherein the CSI configuration information is included in a radio resource control (RRC) message comprising a first integer, a second integer and an offset integer and wherein the first integer and the second integer are used to derive a non-integer periodicity for interference measurement resources (IMR).

9. The processor of claim 1, the operations further comprising:
receiving an information element (IE) from the network indicating a relationship between downlink semi-persistent scheduling (SPS) and CSI measurement and reporting occasions.

10. The processor of claim 1, wherein a CSI-Frequency-Occupation is determined based on downlink semi-persistent scheduling (SPS) physical downlink shared channel (PDSCH) frequency allocation.

11. The processor of claim 1, wherein a CSI-ReportingBand is determined based on downlink semi-persistent scheduling (SPS) physical downlink shared channel (PDSCH) frequency allocation.

12. A processor of a base station configured to perform operations comprising:
transmitting channel state information (CSI) configuration information corresponding to downlink new radio (NR) traffic with non-integer periodicity to a user equipment (UE), wherein the CSI configuration information includes one or more of CSI measurement configuration information and CSI reporting configuration information;
transmitting CSI measurement resources; and
receiving CSI feedback from the UE.

13. The processor of claim 12, wherein the CSI measurement and reporting configuration information is included in a radio resource control (RRC) message comprising a first integer, a second integer and an offset integer and wherein the first integer and the second integer are to be used by the UE to derive a non-integer CSI reporting periodicity.

14. A processor of a user equipment (UE) configured to perform operations comprising:
receiving connected discontinuous reception (cDRX) configuration information for downlink new radio (NR) traffic with non-integer periodicity;
implementing a cDRX cycle based on the configuration information; and
receiving physical downlink control channel (PDCCH) during an onDuration of the cDRX cycle.

15. The processor of claim 14, the operations further comprising:
determining a drxStartOffset using a floor function, wherein the cDRX cycle is further based on a subframe number (SFN) and a hyper-frame number (HFN).

16. The processor of claim 14, the operations further comprising:
receiving a medium access control (MAC) control element (CE) from a network indicating a change to a drxStartOffset.

17. The processor of claim 14, wherein implementing the cDRX cycle includes using a combination of a short DRX cycle and a long DRX cycle and wherein a start of the short DRX cycle and the long DRX cycle is based on a hyper-frame number (HFN).

18. The processor of claim 14, the operations further comprising:
receiving a PDCCH wake up signal (WUS), wherein the PDCCH WUS comprises information for semi-persistent scheduling (SPS) physical downlink shared channel (PDSCH).

19. The processor of claim 18, wherein the information comprises differential modulation and coding scheme (MCS) or an indication to extend the resource allocation.

20. The processor of claim 14, the operations further comprising:
receiving a PDCCH wake up signal (WUS), wherein the PDCCH WUS comprises information for configured grant (CG) physical uplink shared channel (PUSCH).

* * * * *